US008958962B2

(12) United States Patent
Miki et al.

(10) Patent No.: US 8,958,962 B2
(45) Date of Patent: Feb. 17, 2015

(54) ELECTRIC SHIFT OPERATING DEVICE

(71) Applicant: Shimano Inc., Sakai, Osaka (JP)

(72) Inventors: Yoshimitsu Miki, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 48 days.

(21) Appl. No.: 13/857,376

(22) Filed: Apr. 5, 2013

(65) Prior Publication Data

US 2014/0303859 A1 Oct. 9, 2014

(51) Int. Cl.
| | |
|---|---|
| G06F 7/00 | (2006.01) |
| F16H 59/04 | (2006.01) |
| B62M 25/08 | (2006.01) |
| B62K 23/06 | (2006.01) |

(52) U.S. Cl.
CPC ............ F16H 59/044 (2013.01); B62M 25/08 (2013.01); B62K 23/06 (2013.01)
USPC .............. 701/60; 701/51; 74/473.12; 74/488; 74/524

(58) Field of Classification Search
CPC ....... B62K 23/02; B62K 23/06; B62M 25/04; B62M 25/08
See application file for complete search history.

(56) References Cited

U.S. PATENT DOCUMENTS

| | | | | |
|---|---|---|---|---|
| 6,012,353 A | * | 1/2000 | Kawakami | 74/502.2 |
| 7,900,946 B2 | * | 3/2011 | Hara et al. | 280/260 |
| 8,286,529 B2 | * | 10/2012 | Tetsuka | 74/502.2 |
| 2008/0210043 A1 | | 9/2008 | De Perini | |
| 2009/0158881 A1 | * | 6/2009 | Shahana | 74/502 |
| 2010/0294068 A1 | * | 11/2010 | Fujii et al. | 74/473.13 |
| 2013/0030603 A1 | | 1/2013 | Hashimoto et al. | |
| 2014/0070930 A1 | * | 3/2014 | Hara | 340/432 |
| 2014/0137696 A1 | * | 5/2014 | Kosaka et al. | 74/523 |
| 2014/0208887 A1 | * | 7/2014 | Kosaka et al. | 74/523 |
| 2014/0208888 A1 | * | 7/2014 | Kosaka et al. | 74/523 |
| 2014/0209439 A1 | * | 7/2014 | Kosaka et al. | 200/61.54 |

FOREIGN PATENT DOCUMENTS

| | | |
|---|---|---|
| EP | 1384659 A2 | 1/2004 |
| EP | 1526069 A2 | 4/2005 |
| EP | 1932754 A2 | 6/2008 |

* cited by examiner

Primary Examiner — David D Le
(74) Attorney, Agent, or Firm — Global IP Counselors

(57) ABSTRACT

An electric shift operating device is basically provided with a base member, a first operating member, a clicking mechanism, a signal generating arrangement and a controller. The base member is configured to be attached to a bicycle. The first operating member is movably supported on the base member from a rest position to an operated position. The clicking mechanism is operated by the first operating member to produce a haptic feedback response upon the first operating member reaching the first operated position. The signal generating arrangement generates a first shift start signal prior to or upon the first operating member reaching the first operated position. The controller controls a gear position of the electric gear changing device. The controller receives the first shift start signal and operates the electric gear changing device towards a target gear position upon receiving the first shift start signal.

19 Claims, 14 Drawing Sheets

US 8,958,962 B2

ELECTRIC SHIFT OPERATING DEVICE

BACKGROUND

1. Field of the Invention

This invention generally relates to an electric shift operating device. More specifically, the present invention relates to an electric shift operating device that electrically controls a gear position of the electric gear changing device.

2. Background Information

Bicycles are often provided with a gear changing device (e.g., a derailleur or internally geared hub) that can be operated by a rider while riding for changing speeds. In the past, these gear changing devices were operated by cables. More recently, these gear changing devices are electrically controlled. An electric shift operating device can be provided on a bicycle (e.g., on a bicycle handlebar) for a rider to electrically control a gear position of an electric gear changing device. These bicycle component operating devices are usually provided at least one operating member that is movable from a rest position to an operated position for starting operation of the electric gear changing device.

SUMMARY

Generally, the present disclosure is directed to various features of an electric shift operating device that is configured to operate at least one bicycle component. In most conventional bicycle component operating devices, a shift switch is operated (switch become on) after a rider feels click by a click mechanism. According the shift switch is operates the electric gear changing device (e.g., a derailleur or an internally geared hub) after moves the rider senses the shift indication by the click mechanism. So if the movement of the electric gear changing device (e.g., a derailleur or an internally geared hub) is slow, then the rider feels the shift speed is very slow.

In view of the state of the known technology, one object is to provide an electric shift operating device that is configured to make the rider a feel quick shift despite of the shifting speed of the electric gear changing device (e.g., a derailleur or an internally geared hub). Another object is to provide an electric shift operating device that is configured to save electric power and/or make the electric gear changing device (e.g., a derailleur or an internally geared hub) more compact derailleur since a smaller motor can be used as compared to the conventional technology.

In accordance with a first aspect of the present invention, an electric shift operating device is provided that basically comprises a base member, a first operating member, a clicking mechanism, a signal generating arrangement and a controller. The base member is configured to be attached to a bicycle. The first operating member is movably supported on the base member from a first rest position to a first operated position. The clicking mechanism is operated by the first operating member to produce a haptic feedback response upon the first operating member reaching the first operated position. The signal generating arrangement generates a first shift start signal prior to or upon the first operating member reaching the first operated position. The controller is operatively connected to an electric gear changing device to control a gear position of the electric gear changing device. The controller is configured to receive the first shift start signal. The controller operates the electric gear changing device towards a target gear position upon receiving the first shift start signal.

In accordance with a second aspect of the present invention, the electric shift operating device according to the first aspect is configured so that the signal generating arrangement includes one of a tactile switch, a Hall Effect sensor and a magnetoresistive sensor.

In accordance with a third aspect of the present invention, the electric shift operating device according to the first aspect is configured so that the signal generating arrangement non-physically detects operation of the first operating member.

In accordance with a fourth aspect of the present invention, the electric shift operating device according to the first aspect is configured so that the controller operates the electric gear changing device to start moving towards the target gear position upon receiving the first shift start signal before the clicking mechanism of the electric shift operating device produces the haptic feedback response.

In accordance with a fifth aspect of the present invention, the electric shift operating device according to the first aspect further comprising a position signal generating arrangement generating a position signal. The controller determines a movement direction of the first operating member based on the position signal.

In accordance with a sixth aspect of the present invention, the electric shift operating device according to the first aspect is configured so that the position signal generating arrangement and the signal generating arrangement include a single sensor to generate the shift start signal and the position signal.

In accordance with a seventh aspect of the present invention, the electric shift operating device according to the sixth aspect is configured so that the controller determines the first shift start signal and the movement direction of the first operating member based on a level of output of the sensor.

In accordance with an eighth aspect of the present invention, the electric shift operating device according to the first aspect is configured so that the controller determines a movement direction of the first operating member after the electric gear changing device starts moving and before the first operating member reaches the first operated position, and so that the controller operates the electric gear changing device towards an original gear position upon determining that the movement direction of the first operating member is towards the rest position.

In accordance with a ninth aspect of the present invention, the electric shift operating device according to the first aspect further comprises a second operating member movably supported from a second rest position to a second operated position, the clicking mechanism being operated by the second operating member to produce a haptic feedback response upon the second operating member reaching the second operated position, and the signal generating arrangement generating a second shift start signal to or upon the second operating member reaching the second operated position, the controller operating the electric gear changing device towards a target gear position upon receiving the second shift start signal.

In accordance with a tenth aspect of the present invention, a bicycle shifting system is provided that basically comprises an electric gear changing device, an electric shift operating device and a controller. The electric shift operating device includes a first operating member, a clicking mechanism and a signal generating arrangement. The first operating member is movably supported from a first rest position to a first operated position. The clicking mechanism is operated by the first operating member to produce a haptic feedback response upon the first operating member reaching the first operated position. The signal generating arrangement generates a shift start signal prior to or upon the first operating member reaching the first operated position. The controller is operatively connected to the electric gear changing device to control a gear position of the electric gear changing device. The controller is operatively connected to the electric shift operating device to receive the shift start signal of the signal generating arrangement. The controller operates the electric gear changing device towards a target gear position upon receiving the shift start signal from the electric shift operating device.

In accordance with an eleventh aspect of the present invention, the bicycle shifting system according to the tenth aspect is configured so that the signal generating arrangement generates an electric signal as the first operating member moves in a direction away from the first rest position prior to reaching the first operated position.

In accordance with a twelfth aspect of the present invention, the bicycle shifting system according to the eleventh aspect is configured so that the controller determines the electric signal as the shift start signal upon a level of the electric signal becoming above a predetermined level.

In accordance with a thirteenth aspect of the present invention, the bicycle shifting system according to the tenth aspect is configured so that the signal generating arrangement nonphysically detects operation of the first operating member.

In accordance with a fourteenth aspect of the present invention, the bicycle shifting system according to the tenth aspect is configured so that the controller operates the electric gear changing device to start moving towards the target gear position upon receiving the shift start signal from the electric shift operating device before the clicking mechanism of the electric shift operating device produces the haptic feedback response.

In accordance with a fifteenth aspect of the present invention, the bicycle shifting system according to the tenth aspect is configured so that the controller determines a movement direction of the first operating member based on the shift start signal from the signal generating arrangement.

In accordance with a sixteenth aspect of the present invention, the bicycle shifting system according to the fifteenth aspect is configured so that the controller determines the electric signal as the shift start signal and determines the movement direction of the first operating member based on a level of the electric signal.

In accordance with a seventeenth aspect of the present invention, the bicycle shifting system according to the tenth aspect is configured so that the controller determines a movement direction of the first operating member after the electric gear changing device starts moving and before the first operating member reaches the first operated position, and the controller operates the electric gear changing device towards an original gear position upon determining that the movement direction of the first operating member is from the first operated position towards the rest position.

In accordance with an eighteenth aspect of the present invention, the bicycle shifting system according to the seventeenth aspect is configured so that the controller determines the movement direction of the first operating member based on the shift start signal from the signal generating arrangement.

In accordance with a nineteenth aspect of the present invention, the bicycle shifting system according to the tenth aspect further comprises a second operating member movably supported from a second rest position to a second operated position, the clicking mechanism being operated by the second operating member to produce a haptic feedback response upon the second operating member reaching the second operated position, and the signal generating arrangement generating a shift start signal prior to or upon the second operating member reaching the second operated position.

Other objects, features, aspects and advantages of the disclosed electric shift operating device will become apparent to those skilled in the art from the following detailed description, which, taken in conjunction with the annexed drawings, discloses one embodiment of the electric shift operating device.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
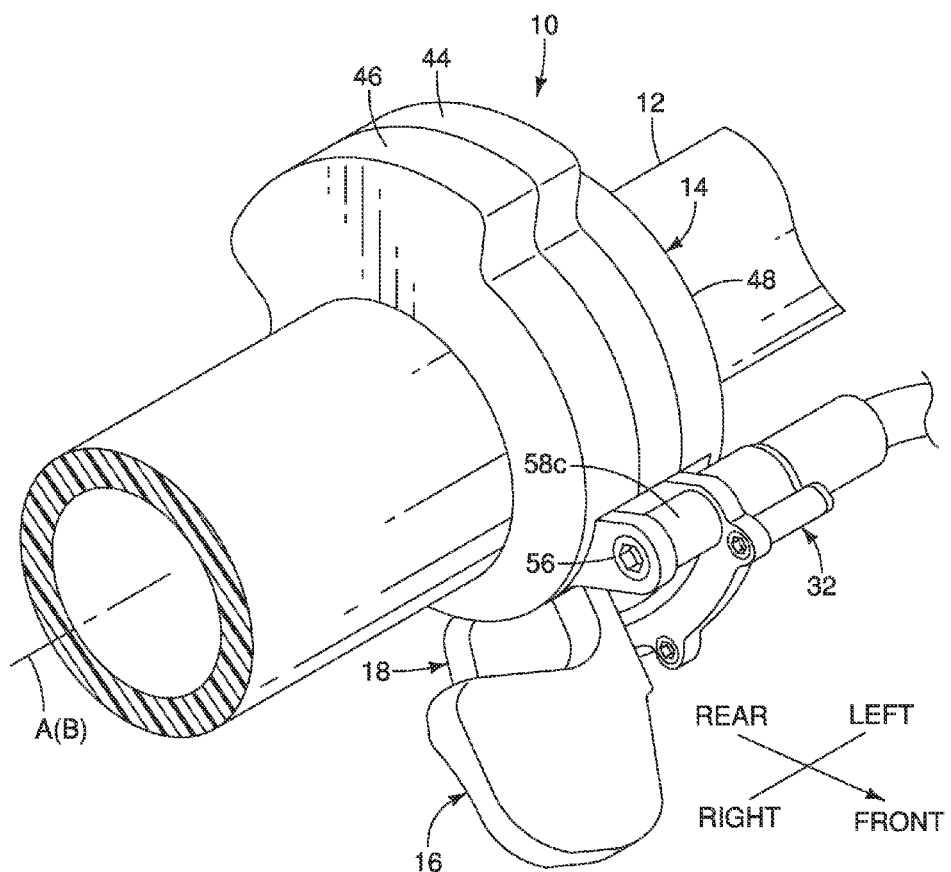
FIG. 1 is a partial perspective view of a right end of a bicycle handlebar that is equipped with an electric shift operating device in accordance with one illustrative embodiment.
Figure 2:
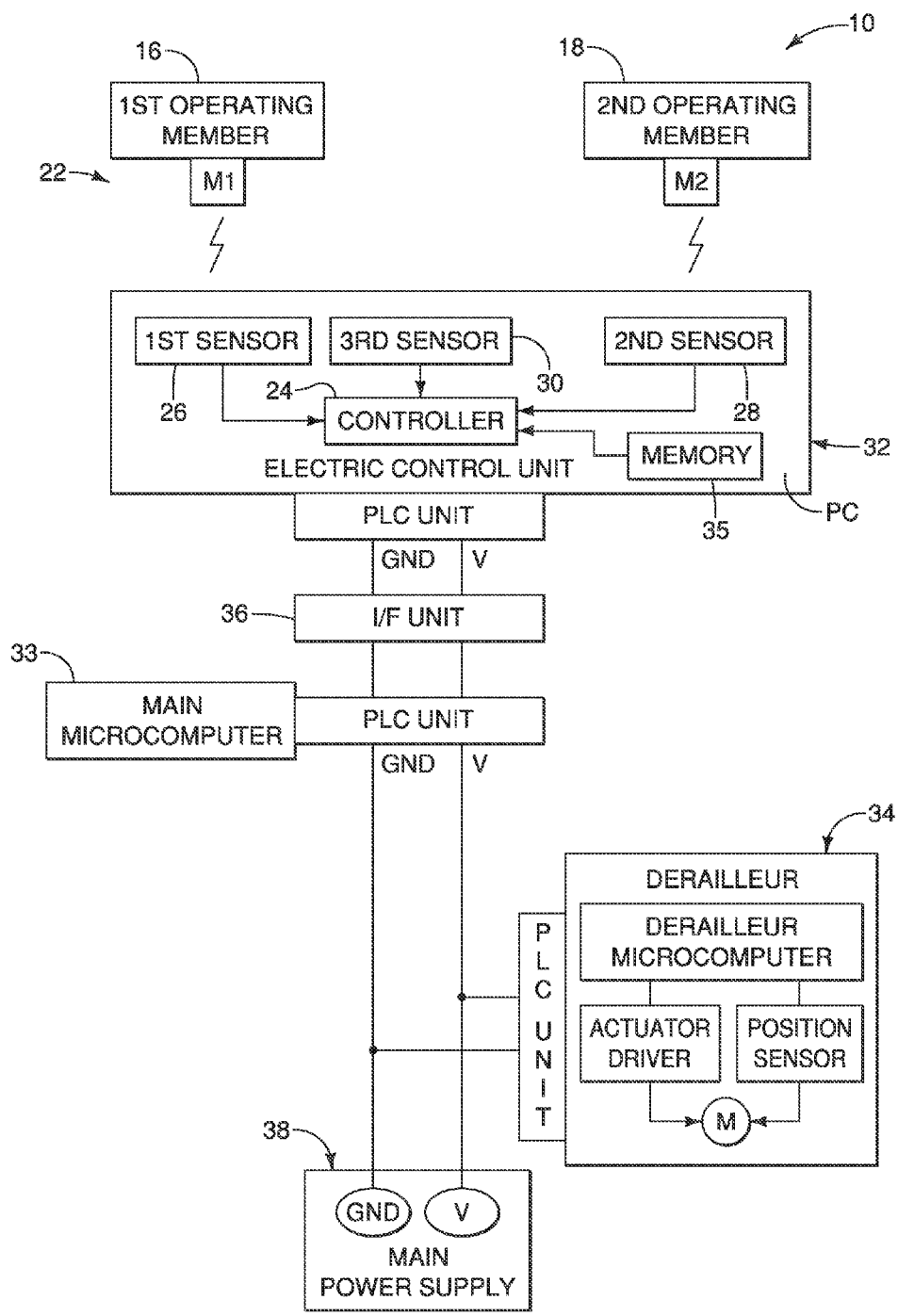
FIG. 2 is a simplified schematic block diagram showing an exemplary configuration of a bicycle control apparatus that includes the electric shift operating device illustrated in FIG. 1.

Referring initially to FIGS. 1 and 2, an electric shift operating device 10 is illustrated in accordance with one illustrative embodiment. The electric shift operating device 10 is mounted on a bicycle handlebar 12 having a handlebar axis A as seen in FIG. 1. As seen in FIG. 2, the electric shift operating device 10 is a part of a bicycle shifting system, which for example in the illustrated embodiment changes a gear ratio of a bicycle drive train as discussed. In the illustrated embodiment, the electric shift operating device basically includes a base member 14, a first operating member 16, a second operating member 18, a clicking mechanism 20, a signal generating arrangement 22 and a controller 24 as seen in FIGS. 1, 2, 5 and 7. The base member 14 is configured to be attached to a bicycle. The first operating member 16 is movably supported on the base member 14 from a first rest position to a first operated position. The second operating member 18 is movably supported from a second rest position to a second operated position.

As explained below, the clicking mechanism 20 notifies a rider of when the first and second operating members 16 and 18 have been moved to operate a bicycle electric component. More specifically, the clicking mechanism 20 is operated by the first operating member 16 to produce a haptic feedback response upon the first operating member 16 reaching the first operated position. In the illustrated embodiment, the second operating member 18 moves the first operating member 16 as the second operating member 18 is moved as discussed below. Thus, in the illustrated embodiment, the clicking mechanism 20 is also operated by movement of the second operating member 18 to produce a haptic feedback response because the first operating member 16 is moved by the second operating member 18.

As shown in FIG. 2, the signal generating arrangement 22 basically includes a first sensor 26, a first magnet M1, a second sensor 28 and a second magnet M2. In the illustrated embodiment, as also shown in FIG. 2, the signal generating arrangement 22 preferably further includes a third sensor 30. Preferably, for example, the controller 24, the first sensor 26, the second sensor 28 and the third sensor 30 are integrated together on a printed circuit board PC that forms an electric control unit 32. The electric control unit 32 has a housing that is mounted to the base member 14. However, the signal generating arrangement 22 can be configured only with the first sensor 26 and the first magnet M1.

In the illustrated embodiment, the controller 24 is disposed on the printed circuit board PC of the electric shift operating device 10 shown in FIG. 1. However, the controller 24 can be formed as a part of other portion of a bicycle, such as a part of a controller or microprocessor of a transmission or a part of a main microcomputer 33. The main microcomputer 33 is mounted on a portion of a bicycle in a conventional manner. The main microcomputer 33 further includes a central processing unit (CPU) and conventional components such as an input interface circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the main microcomputer 33 can be any combination of hardware and software that will carry out the functions of the present invention.

As shown in FIG. 2, the controller 24 is operatively connected to the electric shift operating device 10 to receive shift start signals of the signal generating arrangement 22. The controller 24 is also operatively connected to an electric gear changing device, such as an electrically operable derailleur 34 or an electrically operable internally geared hub, to control a gear position of the electric gear changing device. More specifically, the signal generating arrangement 22 generates shift start signals by movement of each of the first and second operating members 16 and 18 to operate an electric gear changing device such as the derailleur 34 or an electrically operable internally geared hub. The controller 24 operates the electric gear changing device such as the derailleur 34 towards a target gear position upon receiving the shift start signal from the electric shift operating device 10. Specifically, in the illustrated embodiment, the controller 24 is configured to receive the first and second shift start signals from the signal generating arrangement 22. The controller 24 operates the electric gear changing device such as the derailleur 34 towards a first target gear position upon receiving the first shift start signal, and operates the electric gear changing device such as the derailleur 34 towards a second target gear position upon receiving the second shift start signal.

Thus, the bicycle shifting system of the present invention basically comprises an electric gear changing device such as the derailleur 34, an electric shift operating device such as the electric shift operating device 10 and a controller such as the controller 24. The derailleur 34 can be either a front derailleur or a rear derailleur. Since electric gear changing devices such as electrically operable derailleurs are well known in the bicycle field, details of the derailleur 34 have been omitted for the sake of brevity.

In the illustrated embodiment, the main microcomputer 33 is configured to receive signals and process the signals to at least control the electrically operable derailleur 34 (i.e., the electric gear changing device). The main microcomputer 33 is programmed to selectively change shift the derailleur 34 in response to a manual input from a rider operating the first and second operating members 16 and 18 or an automatic input from a control program in the main microcomputer 33. In other words, the main microcomputer 33 is configured to selectively change a gear position of the derailleur 34 either manually or automatically.

Figure 3:
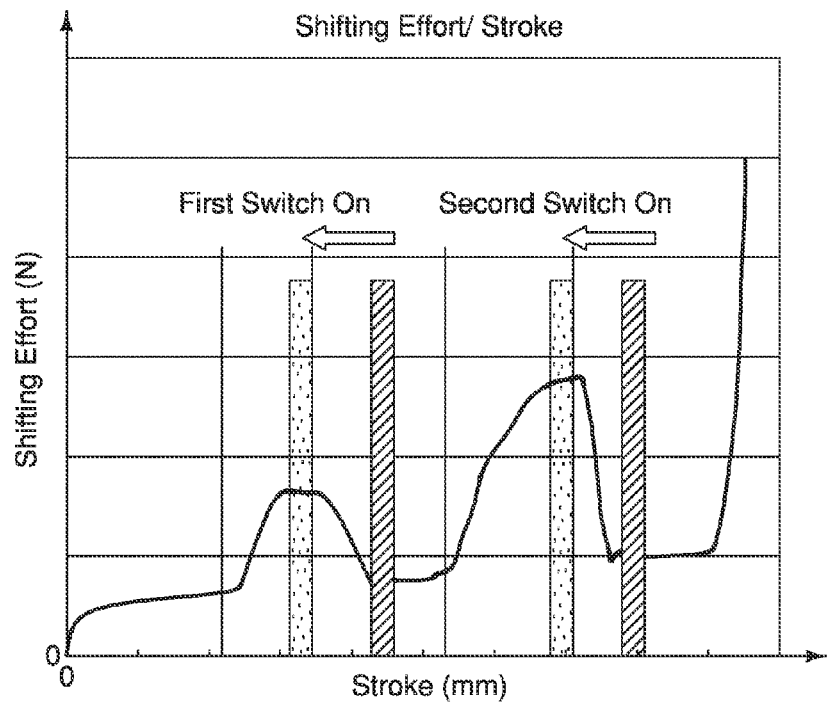
FIG. 3 is a graph showing a relationship a stroke amount of the first and second operating members with respect to the shifting effort of the first and second operating members due to operation of the clicking mechanism.

As illustrated in FIG. 2, the signal generating arrangement 22 further includes a memory 35 and an I/F unit 36 (e.g., a user input). The memory 35 stores a user settings. The memory 35 includes a nonvolatile memory, and is mounted on a printed circuit board PC with the controller 24, the first sensor 26, the second sensor 28 and the third sensor 30. In the illustrated embodiment, as shown in FIG. 2, the I/F unit 36 is electrically disposed between the signal generating arrangement 22 and the main microcomputer 33. As illustrated in FIG. 3, the electric shift operating device 10 is electrically coupled to an external device, such as a personal computer, a cycle computer, and the like, via the I/F unit 36 for setting user settable parameters. The I/F unit 36 electrically connecting the electric shift operating device 10 with a personal computer is discussed in U.S. Patent Application Publication 2013/0030603. Thus, detailed configuration of the I/F unit 36 will be omitted for the sake of brevity. In the illustrated embodiment, the memory 35 and the I/F unit 36 are formed as a part of the signal generating arrangement 22. However, the memory 35 and the I/F unit 36 can be formed as a part of the controller 24. In other words, the controller 24 can include the memory 35 and the I/F unit 36.

Figure 4:
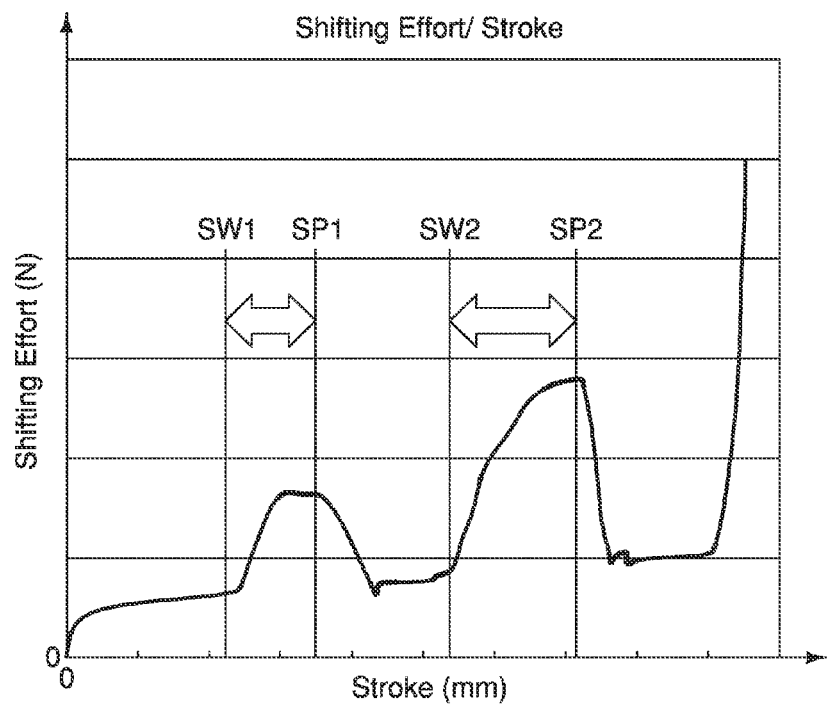
FIG. 4 is another graph showing a relationship a stroke amount of the first and second operating members with respect to the shifting effort of the first and second operating members due to operation of the clicking mechanism.

Referring now to FIGS. 3 and 4, the graphs of FIGS. 3 and 4 shows a relationship a stroke amount of the first and second operating members 16 and 18 with respect to the shifting effort of the first and second operating members 16 and 18 due to an operation force need to operate of the clicking mechanism 20. In the illustrated embodiment, the clicking mechanism 20 produces the haptic feedback response by creating a clicking feeling in the first and second operating members 16 and 18 due to the change in the operation force need to operate of the clicking mechanism 20. As explained below and as seen in the graphs of FIGS. 3 and 4, the clicking mechanism 20 produces two haptic feedback responses.

In the graph of FIG. 3, the columns shaded with dots indicate the illustrated embodiment, while the columns shaded with diagonal lines indicate a conventional configuration. In the conventional configuration, the shift start signals are sent to the electric gear changing device after the clicking mechanism 20 has moved past the point of producing the haptic feedback response by the first operating member 16 reaching an operated position in which the operation force of the clicking mechanism 20 has begun to fall down back to a base level for moving the first and second operating members 16 and 18. With the configuration of the illustrated embodiment, the controller 24 operates the electric gear changing device such as the derailleur 34 to start moving towards the target gear position upon receiving one of the first and second shift start signals from the electric shift operating device 10 before the clicking mechanism 20 of the electric shift operating device 10 produces the haptic feedback response. On the other hand, in the conventional configuration, the signals to start moving the electric gear changing device towards the target gear position occurs after the clicking mechanism 20 of the electric shift operating device 10 has produced the haptic feedback response.

In the graph of FIG. 4, in the illustrated embodiment, the signal generating arrangement 22 preferably generates a first shift start signal at an operated position SW1, which is prior to or upon the first operating member 16 reaching a first operated position SP1. When the first operating member 16 is moved further in a single progressive stoke, the signal generating arrangement 22 preferably generates an additional first shift start signal at an operated position SW2, which is prior to or upon the first operating member 16 reaching a second operated position SP2. Similarly, since the first operating member 16 is moved by the movement of the second operating member 18, the signal generating arrangement 22 preferably generates a second shift start signal at the operated position SW1 prior to or upon the second operating member 18 reaching the first operated position SP1, which is also corresponds to a second operated position for the second operating member 18. When the second operating member 18 is moved further in a single progressive stoke, the signal generating arrangement 22 preferably generates an additional second shift start signal at the operated position SW2, which is prior to or upon the second operating member 18 reaching the second operated position SP2.

Preferably, the controller 24 determines a movement direction of the first operating member 16 after the electric gear changing device starts moving and before the first operating member 16 reaches the first operated position SP1. However, the controller 24 operates the electric gear changing device towards an original gear position upon determining that the movement direction of the first operating member 16 is towards the rest position. Basically, the first gear shift is not completed until the position of the first operating member 16 pasts the first operated position SP1. Thus, if the first operating member 16 is returned back to the rest position without passing the first operated position SP1, then the controller 24 will send a control signal to have the electric gear changing device such as the derailleur 34 return without causing a first gear shift to occur (the electric gear changing device returns to the original gear position without causing a first gear shift). Similarly, the second gear shift is not completed until the position of the first operating member 16 pasts the second operated position SP2. Thus, if the first operating member 16 is returned back to the rest position without passing the second operated position SP2, then the controller 24 will send a control signal to have the electric gear changing device such as the derailleur 34 return without causing the second gear shift to occur.

The controller 24 determines a movement direction of the second operating member 18 in the same manner as the first operating member 16, since the first operating member 16 is moved by the movement of the second operating member 18. Thus, the same determination used for the first operating member 16 as whether to complete a gear shift or not is also used for the second operating member 18.

Now, the signal generating arrangement 22 will be discussed in more detail with reference to FIGS. 2 and 8 to 14. In the illustrated embodiment, the first and second sensors 26 and 28 wirelessly or non-physically detect the operation of the first and second operating members 16 and 18. In other words, the signal generating arrangement 22 non-physically detects operation of the first operating member 16 and the second operating member 18. In the illustrated embodiment, the first and second sensors 26 and 28 are Hall Effect sensors (Hall IC) which include a Hall Effect element, and a comparator. The first and second sensors 26 and 28 output a first signal (e.g. H-signal) when Hall Effect element detects the strength of magnet field is equal or larger than a predetermined value, and a second signal (e.g. L-signal) when Hall Effect element detects the strength of magnet field is smaller than the predetermined value. Specifically, as illustrated in FIGS. 10 to 14, the first operating member 16 has the magnet M1 fixed thereto and the second operating member 18 has the magnet M2 fixed thereto. In the illustrated embodiment, the first sensor 26 detects the strength of the magnetic field of the magnet M1 of the first operating members 16. The second sensor 28 detects strength of the magnetic field of the magnet M2 of the second operating members 18. In other words, in the illustrated embodiment, the signal generating arrangement 22 of the present application detects the strength of a magnetic field to detect the operated positions (e.g., input positions). Thus, signal generating arrangement 22 of the present application also acts as a position signal generates arrangement that generates a position signal. The controller 24 determines a movement direction of the first operating member 16 and the second operating member 18 based on the position signal. In particular, in the illustrated embodiment, the signal generating arrangement 22 non-physically detects the operated positions of the first and second operating members 16 and 18 (e.g., an input position of at least one operating member). The signal generating arrangement 22 (position signal generating arrangement) include a single sensor (e.g., the first and second sensors 26) to generate the first shift start signal and the position signal and a single sensor (e.g., the first and second sensors 26) to generate the first shift start signal and the position signal. However, the first and second sensors 26 and 28 can be, for example, resistive position sensors, optical position sensors, magnetoresistive sensors, etc. Furthermore, other types of position sensing arrangements can be utilized as needed and/or desired. For example, the first and second sensors 26 and 28 could be electrically connected to the first and second operating members 16 and 18, respectively, by using contacts and brushes and/or using wires in a conventional manner. Furthermore, the first and second sensors 26 and 28 can be tactile switches. Thus, in the illustrated embodiment, the signal generating arrangement 22 preferably includes at least one of a tactile switch, a Hall Effect sensor and a magnetoresistive sensor.

Basically, the first sensor 26 detects operation of the first operating member 16, and outputs signals to the controller 24 based on the movement of the first operating member 16. Specifically, the first sensor 26 detects an operated position of the first operating member 16. The first sensor 26 of the signal generating arrangement 22 generates an electric signal as the first operating member 16 moves in a direction away from the first rest position prior to reaching the first operated position SP1. The controller 24 determines the first shift start signal and the movement direction of the first operating member 16 based on a level of output of the first sensor 26. The controller 24 determines the electric signal of the first sensor 26 as the shift start signal and determines the movement direction of the first operating member 16 based on a level of the electric signal. In particular, the controller 24 determines the electric signal of the first sensor 26 as the shift start signal upon a level of the electric signal becoming above a predetermined level (e.g. a voltage level). The controller 24 also determines the movement direction of the first operating member 16 based on a level of the shift start signal (an electric signal) from the signal generating arrangement 22. Preferably, the controller 24 determines the movement direction of the first operating member 16 after the electric gear changing device starts moving and before the first operating member 16 reaches the first operated position. In this way, the controller 24 can determine whether or not to complete the shifting operation. In particular, the controller 24 operates the electric gear changing device towards an original gear position upon determining that the movement direction of the first operating member 16 is from the first operated position towards the rest position. This determination of the movement direction of the first operating member 16 can be done solely with the first sensor 26. However, preferably, the third sensor 28 is used to more accurately determine the movement direction of the first operating member 16.

The second sensor 28 detects operation of the second operating member 18, and outputs signals to the controller 24 based on the movement of the second operating member 18. Specifically, the second sensor 28 detects an operated position of the second operating member 18. The second sensor 28 of the signal generating arrangement 22 also generates an electric signal as the second operating member 18 moves in a direction away from the second rest position.

The third sensor 30 detects the first and second operating members 16 and 18. In the illustrated embodiment, the third sensor 30 wirelessly or non-physically detects the first and second operating members 16 and 18. Specifically, in the illustrated embodiment, the third sensor 30 is a magnetoresistive sensor. The third sensor 30 detects positions of the first and second operating members 16 and 18, or movements of the first and second operating members 16 and 18. Specifically, in the illustrated embodiment, the third sensor 30 is arranged to detect vector of a magnetic field of the magnet M1. Of course, the third sensor 30 can be arranged to detect a magnet other than the magnet M1. Of course, the third sensor 30 can be other type of sensors, such as a resistive position sensor, an optical position sensor, a Hall Effect sensor, or other MR sensor. Furthermore, other types of position sensing arrangements can be utilized as needed and/or desired.

The bicycle control apparatus further includes a main power supply 38 (e.g., a battery or capacitor as shown) for supplying electrical power to the signal generating arrangement 22 of the electric shift operating device 10, the main microcomputer 33 and the derailleur 34. However, the main power supply 38 is not limited to a battery as a power source. Rather, for example, a generator by itself or a generator with a battery can be used for the main power supply 38. Also the various components of the bicycle control apparatus can be provided with their own individually battery or capacitor instead of receiving power from the main power supply 38.

Here, in the illustrated embodiment, the signal generating arrangement 22 of the electric shift operating device 10 and the derailleur 34 are electrically connected to the main microcomputer 33 by electrical cables that transmit control signals using signal lines S and the transmit power using conductive lines GND and V. However, the main microcomputer 33 can execute two-way communications using electric power line communications (PLC) if needed and/or desired. Moreover, wireless communications could be used to transmit control signals between the main microcomputer 33 and the signal generating arrangement 22 of the electric shift operating device 10 and/or between the main microcomputer 33 and the derailleur 34 if needed and/or desired.

In the illustrated embodiment, as explained below, the first operating member 16 has two operated positions that each causes the signal generating arrangement 22 to generate control signals. Likewise, as explained below, the second operating member 18 has two operated positions that each causes the signal generating arrangement 22 to generate control signals. Furthermore, the controller 24 determines an operational direction or position of the second operating member 18 based on the signal from the third sensor 30, if used. The controller 24 can determine the operational direction or position of the second operating member 18 based on the signal from the MR sensor (i.e., the third sensor 30) in a conventional manner. In the illustrated embodiment, since the first and second operating members 16 and 18 move together as the second operating member 18 is moved, the controller 24 can determine the operational direction or position of the second operating member 18 by detecting the position of the first operating member 16 based on the signal from the first sensor 26 and the second sensor 28.

Figure 8:
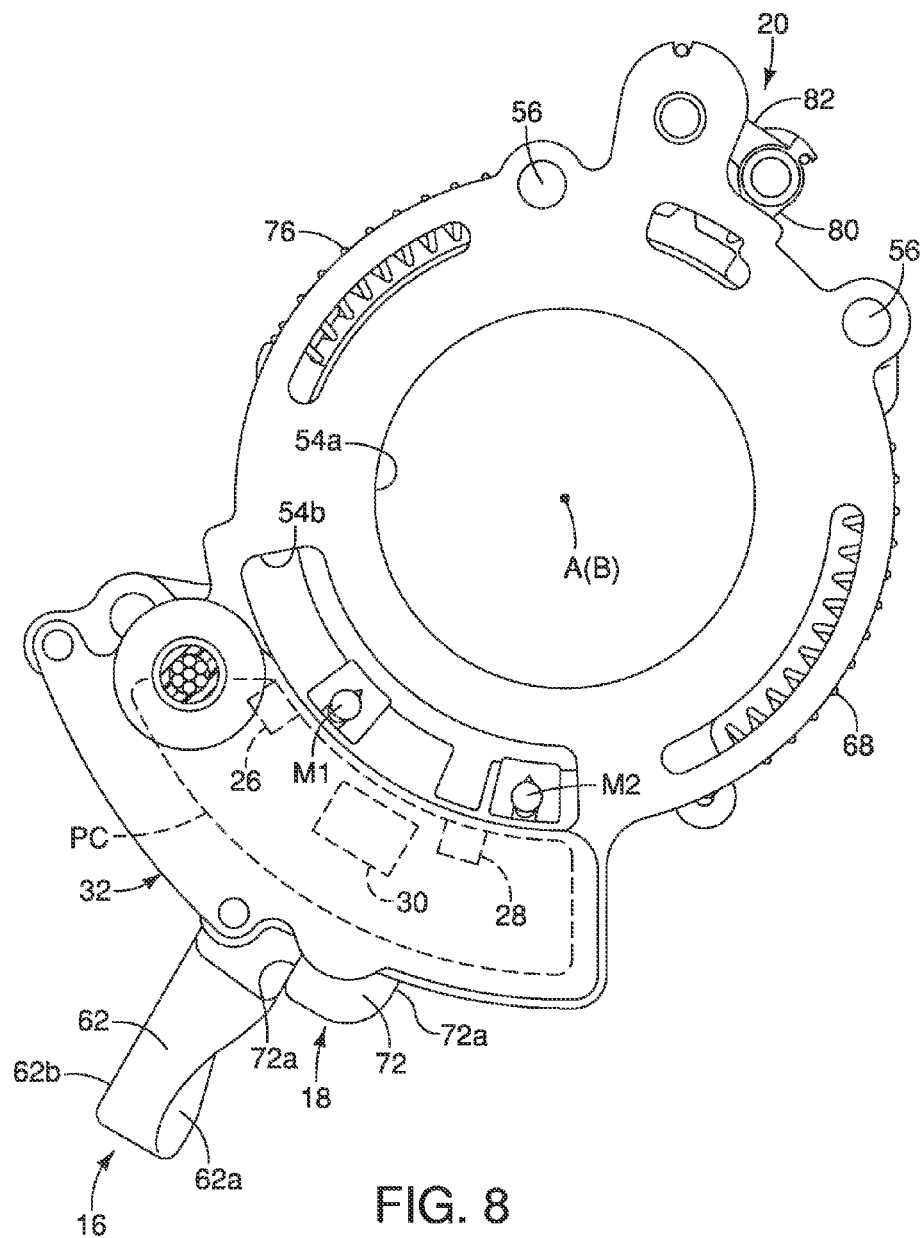
FIG. 8 is an elevational view of the selected parts of the electric shift operating device illustrated in FIG. 7 looking from the center of the handlebar toward the right end of the handlebar.

In the illustrated embodiment, the controller 24 determines the short stroke operation and the long stroke operation of each of the first and second operating members 16 and 18 based on the signal from the third sensor 30. Specifically, as illustrated in FIG. 8, the controller 24 of the signal generating arrangement 22 determines whether the first operating member 16 is in the first operated position (FIG. 11) or the second operated position (FIG. 12) that is spaced away from the first operated position based on the signal from the third sensor 30. Specifically, as illustrated in FIGS. 3 and 4, the shifting effort with respect to the shift stroke has two peaks followed by two valleys due to the clicking mechanism 20 that notifies a rider of when the first and second operating members 16 and 18 have been moved to operate a bicycle electric component.

Figure 5:
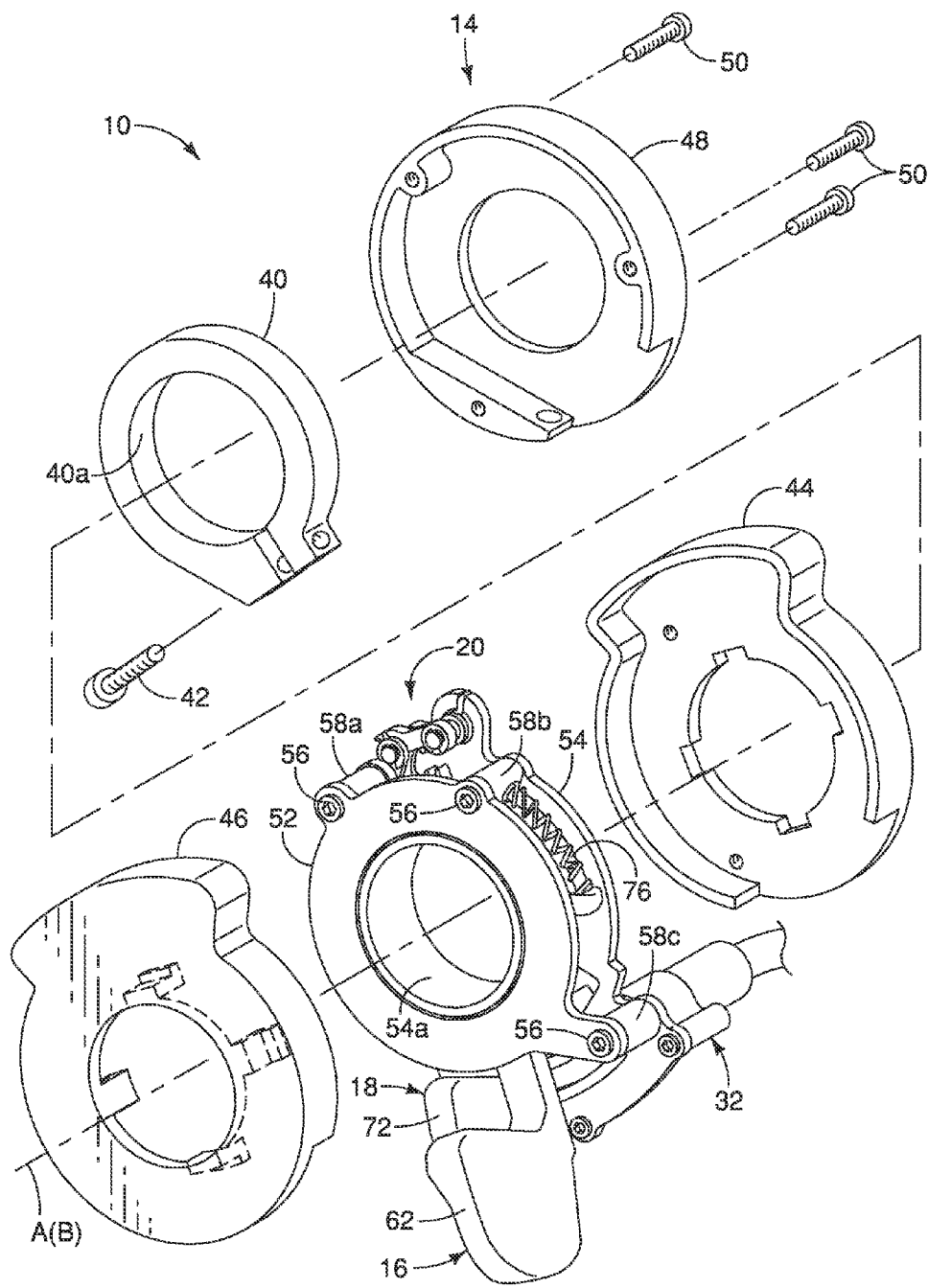
FIG. 5 is an exploded perspective view of selected parts of the electric shift operating device illustrated in FIG. 1 with a housing and a handlebar clamp removed.

Referring to FIGS. 5 to 15, the mechanical configurations of the electric shift operating device 10 will further be described in detail. As seen in FIG. 5, the base member 14 includes a fixing member 40 that is configured to be fixed to the handlebar 12 of a bicycle. As a result, the first operating member 16 is configured to rotate about the handlebar axis A while the base member 14 is attached to the bicycle handlebar (hereinafter just "handlebar") 12. Likewise, the second operating member 18 is configured to rotate about the handlebar axis A while the base member 14 is attached to the handlebar 12. In the illustrated embodiment, the fixing member 40 is a conventional tube clamp that squeezes the handlebar 12 by tightening a fixing bolt 42.

As seen in FIG. 5, the fixing member 40 of the base member 14 includes a handlebar receiving opening 40a defining a handlebar mounting axis B. The handlebar mounting axis B coincides with the handlebar axis A of the handlebar 12 when mounted to the handlebar 12. Thus, the base member 14 is configured to be attached to the handlebar 12 by the fixing member 40. In the illustrated embodiment, the base member 14 further includes a first cover member 44, a second cover member 46 and a third cover member 48. The first and second cover members 44 and 46 are snap-fitted together to form a housing that partially encloses the first and second operating members 16 and 18. The third cover member 48 is fixedly connected to the fixing member 40 by passing the fixing bolt 42 through an opening of the cover member 48. The third cover member 48 attaches the fixing member 40 to the first and second cover members 44 and 46. In this way, the first and second cover members 44 and 46 are non-rotatably fixed to the handlebar 12 by the fixing member 40. The first, second and third cover members 44, 46 and 48 are made of a suitable material such as a hard rigid plastic.

Still referring to FIG. 5, in the illustrated embodiment, the base member 14 further includes a first support member 52 and a second support member 54. The first and second support members 52 and 54 are fixed together by a plurality (three) of threaded fasteners 56. The first and second support members 52 and 54 are spaced apart by a plurality (three) of spacers 58a, 58b and 58c. The first and second operating members 16 and 18 are compactly arranged between the first and second support members 52 and 54 as an integrated unit.

Figure 6:
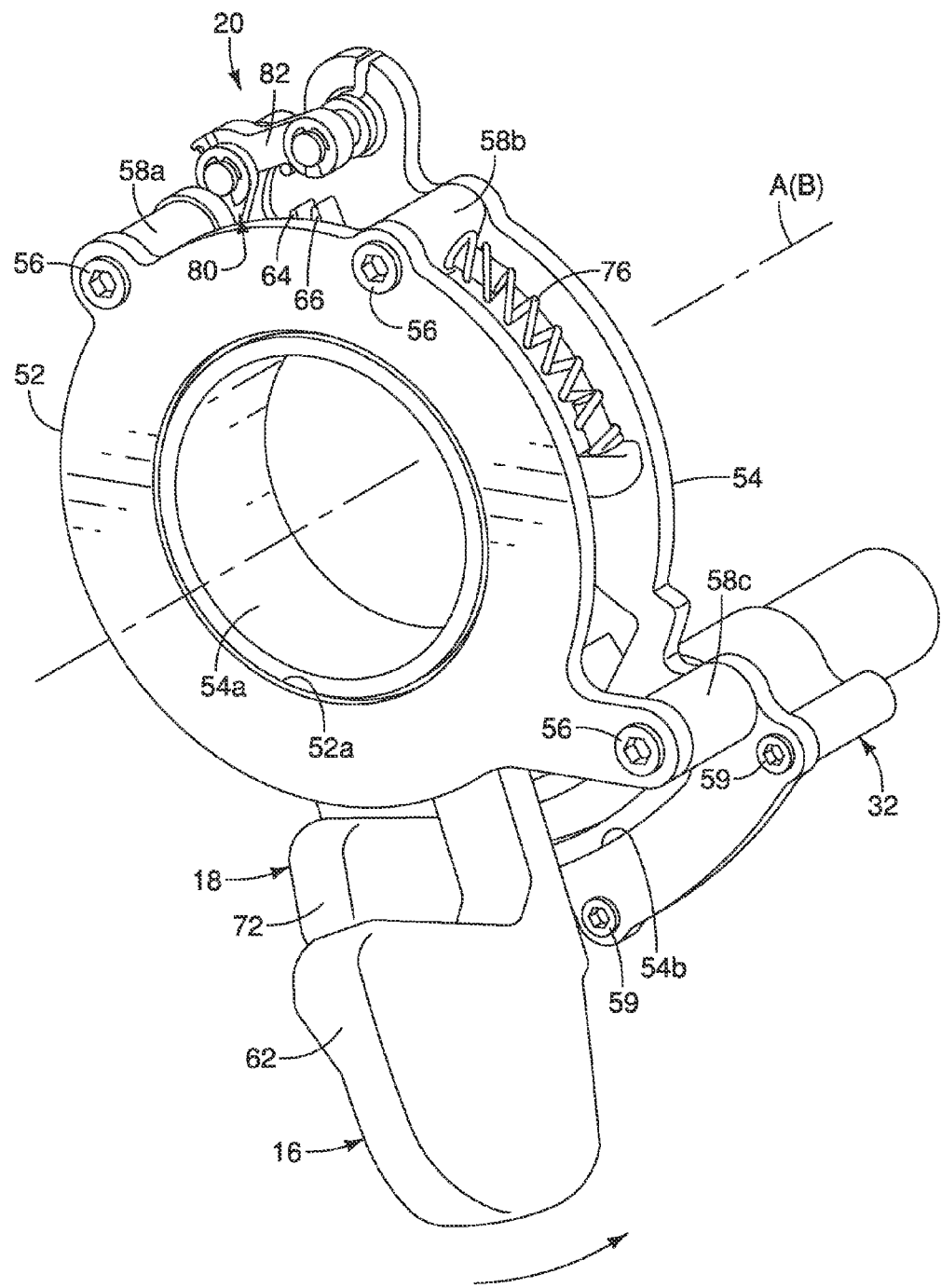
FIG. 6 is an enlarged perspective view of the electric shift operating device illustrated in FIG. 1.
Figure 7:
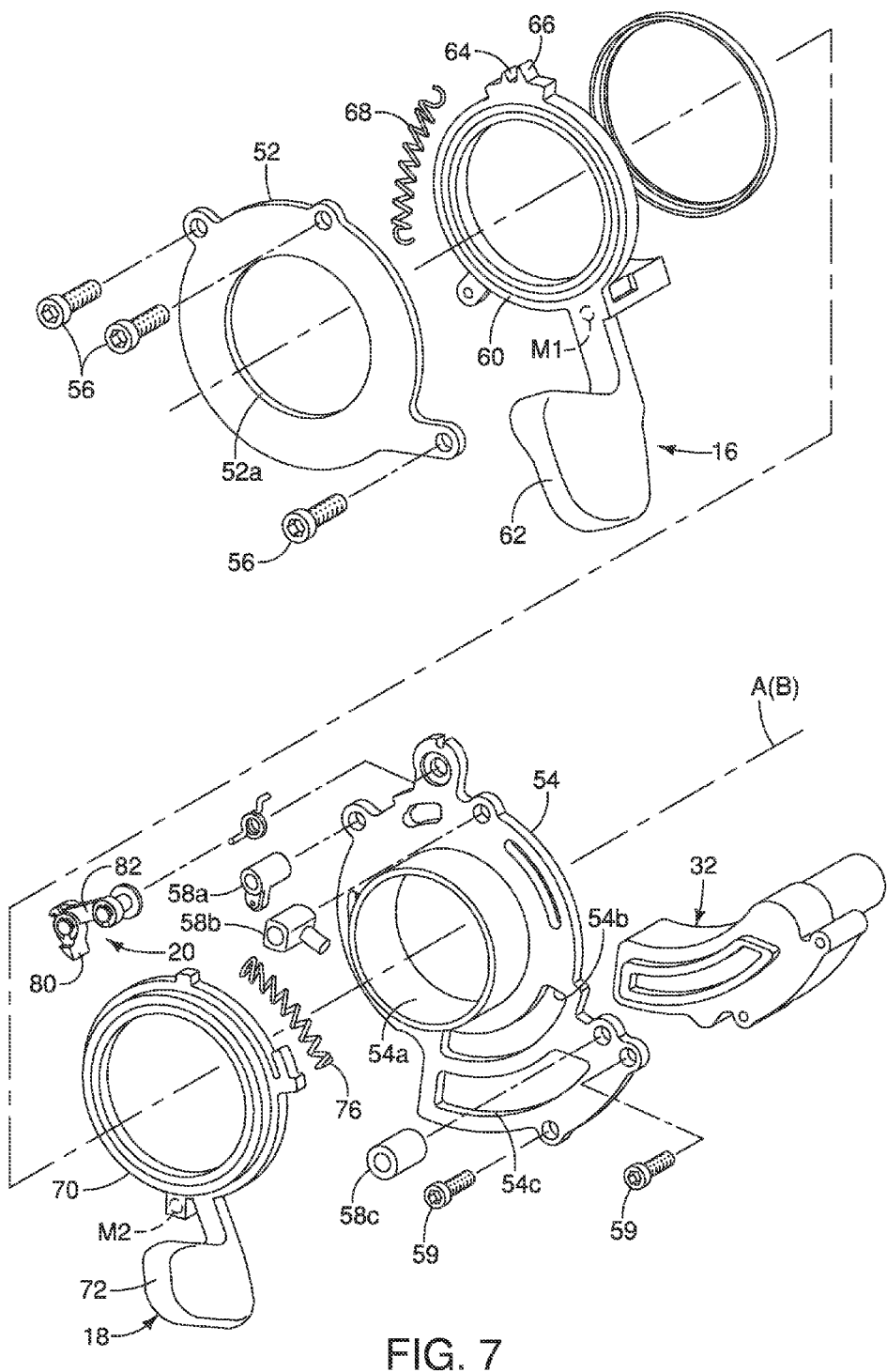
FIG. 7 is a further exploded perspective view of the selected parts of the electric shift operating device illustrated in FIG. 6.

As seen in FIGS. 5 to 8, the second support member 54 preferably has a tubular portion 54a that forms a handlebar receiving part of the base member 14. The tubular portion 54a extends into an opening 52a of the first support member 52 as seen in FIG. 6. Although not shown, preferably, two bearings provided on the tubular portion 54a for rotatably supporting the first and second operating members 16 and 18 on the tubular portion 54a. In other words, a first bearing is disposed between the first operating member 16 and the outer surface of the tubular portion 54a, and a second bearing is disposed between the second operating member 18 and the outer surface of the tubular portion 54a. As seen in FIGS. 6 and 7, the electric control unit 32 is attached to the second support member 54 by a pair of screws 59. In the illustrated embodiment, the second support member 54 preferably has an arc shaped opening 54b for receiving therethrough portions of the first and second operating members 16 and 18 that contain the magnets M1 and M2, respectively. Furthermore, the second support member 54 preferably has an opening 54c for receiving portion of the electric control unit 32 to further support the electric control unit 32 on the second support member 54.

Referring to FIGS. 7 to 15, the first and second operating members 16 and 18 will be now described in more detail. In the illustrated embodiment, as best seen FIG. 7, the first operating member 16 includes a first mounting part 60 and a first lever part 62 (i.e., a first user operating lever). The first mounting part 60 of the first operating member 16 includes a first projection 64 and a second projection 66 for cooperating with the clicking mechanism 20 as discussed below. As best seen FIGS. 10 to 14, the first operating member 16 is biased toward a first rest position by a biasing element 68 so as to return to the first rest position after being operated to an operated position. Similarly, in the illustrated embodiment, the second operating member 18 includes a second mounting part 70 and a second lever part 72 (i.e., a second user operating lever). The second operating member 18 is biased toward a second rest position by a biasing element 76 so as to return to the second rest position after being operated to an operated position.

As explained above, the first operating member 16 has two operated positions that each causes the signal generating arrangement 22 to generate control signals. Likewise, as explained above, the second operating member 18 also has two operated positions that each causes the signal generating arrangement 22 to generate control signals. For example, the signal generating arrangement 22 generates control signals as the first operating member 16 reaches the first operated position (FIG. 11) and the second operated position (FIG. 12), and as the second operating member 18 reaches the first operated position (FIG. 13) and the second operated position (FIG. 14).

In the illustrated embodiment, since both the first and second operating members 16 and 18 use the clicking mechanism 20 to notify the rider when the first and second operating members 16 and 18 have reached the operated position that cause the signal generating arrangement 22 to generate control signals, the first and second operating members 16 and 18 are moved the same amounts to reach the operated positions. More specifically, the first operating member 16 is rotated from the first rest position (FIG. 10) by a first prescribed distance D1 to reach its first operated position (FIG. 11), and rotated from the first rest position (FIG. 10) by a second prescribed distance D2 to reach its second or fully operated position (FIG. 12). Also, the second operating member 18 is rotated from the second rest position (FIG. 10) by the first prescribed distance D1 to reach its first operated position (FIG. 13), and rotated from its second rest position (FIG. 10) by the second prescribed distance D2 to reach its second or fully operated position (FIG. 14).

As seen in FIGS. 11 to 14, the first operating member 16 and the second operating member 18 are rotatably supported on the tubular portion 54a of the base member 14 to rotate about the handlebar mounting axis B. As a result, the first operating member 16 is configured to rotate about the handlebar axis A and the handlebar mounting axis B between the first rest position and a first operated position while the base member 14 is attached to the handlebar 12. Similarly, the second operating member 18 is configured to rotate about the handlebar axis A between a second rest position and a second operated position while the base member 14 is attached to the handlebar 12.

Figure 11:
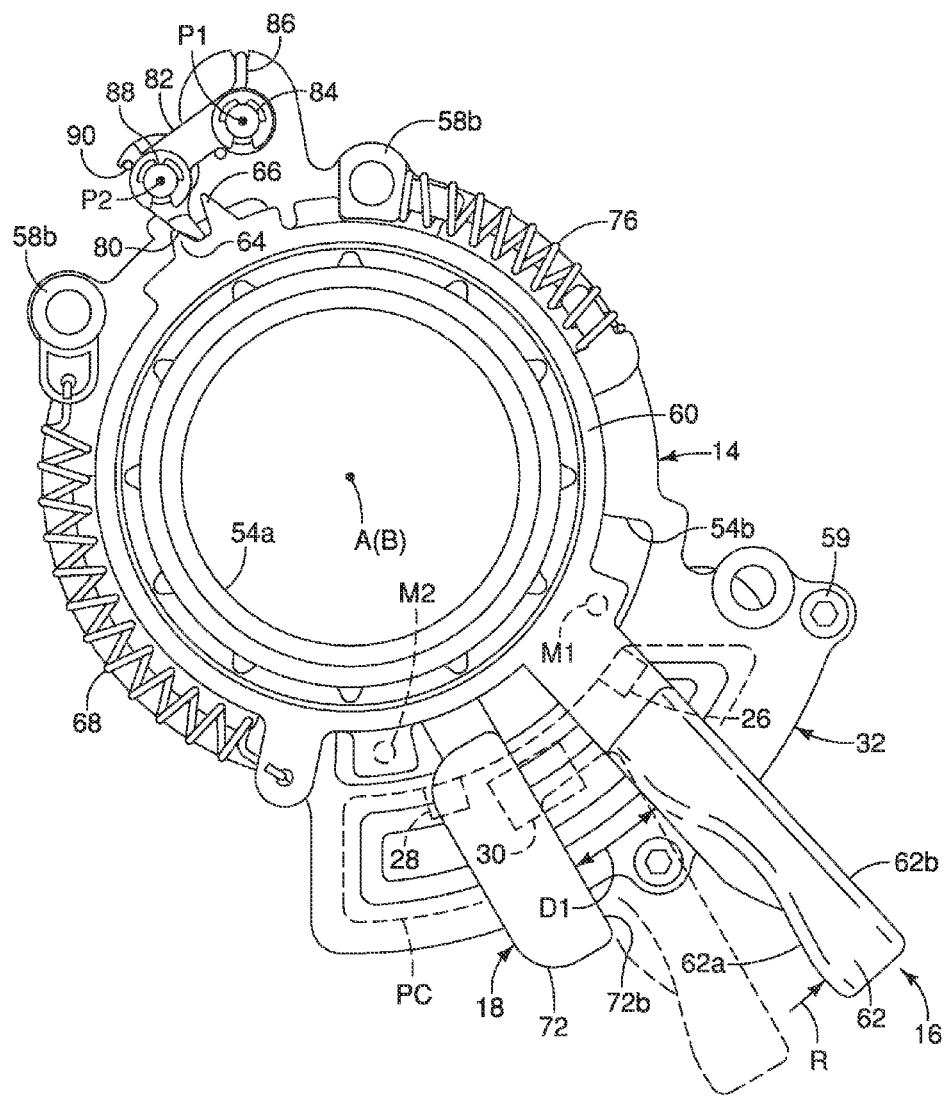
FIG. 11 is an elevational view of the selected parts of the electric shift operating device with the first operating member moved to an operated position and the second operating member in the rest position.
Figure 12:
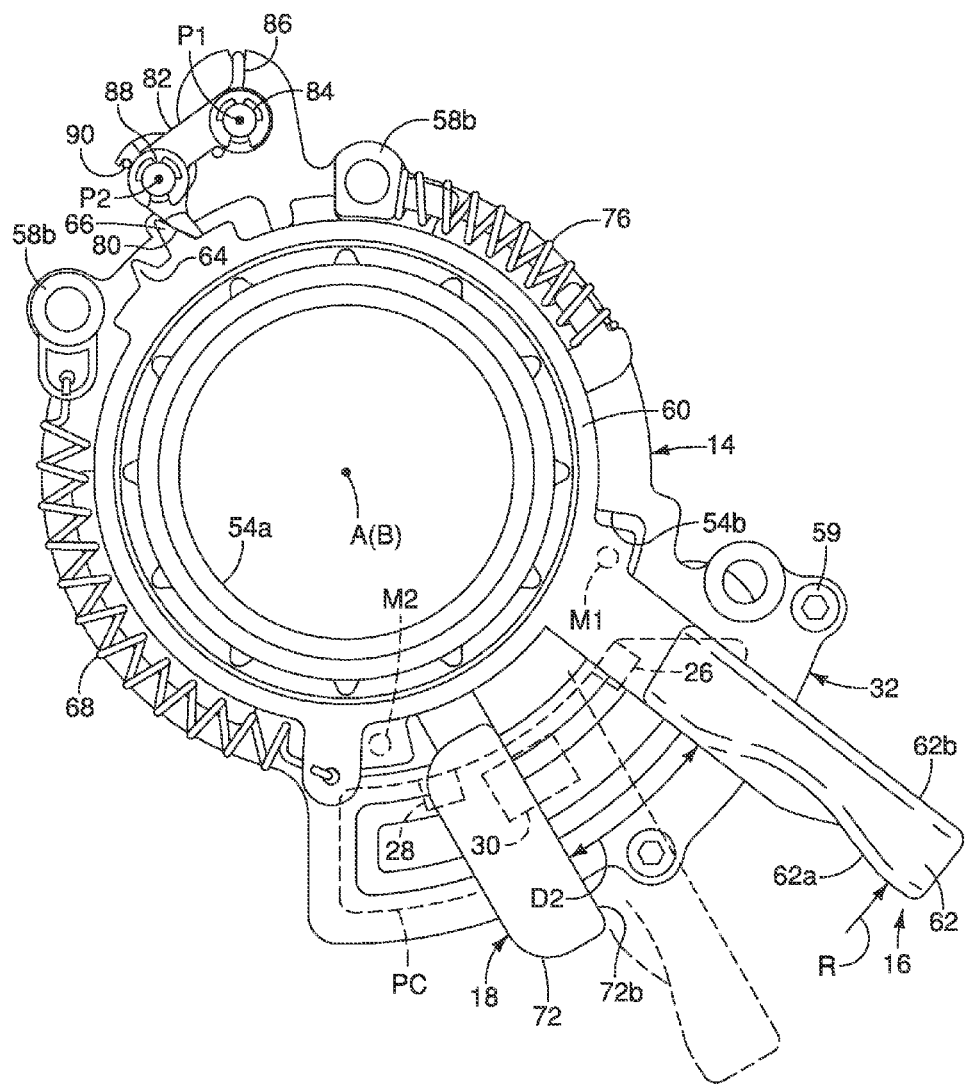
FIG. 12 is an elevational view of the selected parts of the electric shift operating device with the first operating member moved to an operated position that is further from the rest position than in FIG. 11, and the second operating member in the rest position.
Figure 13:
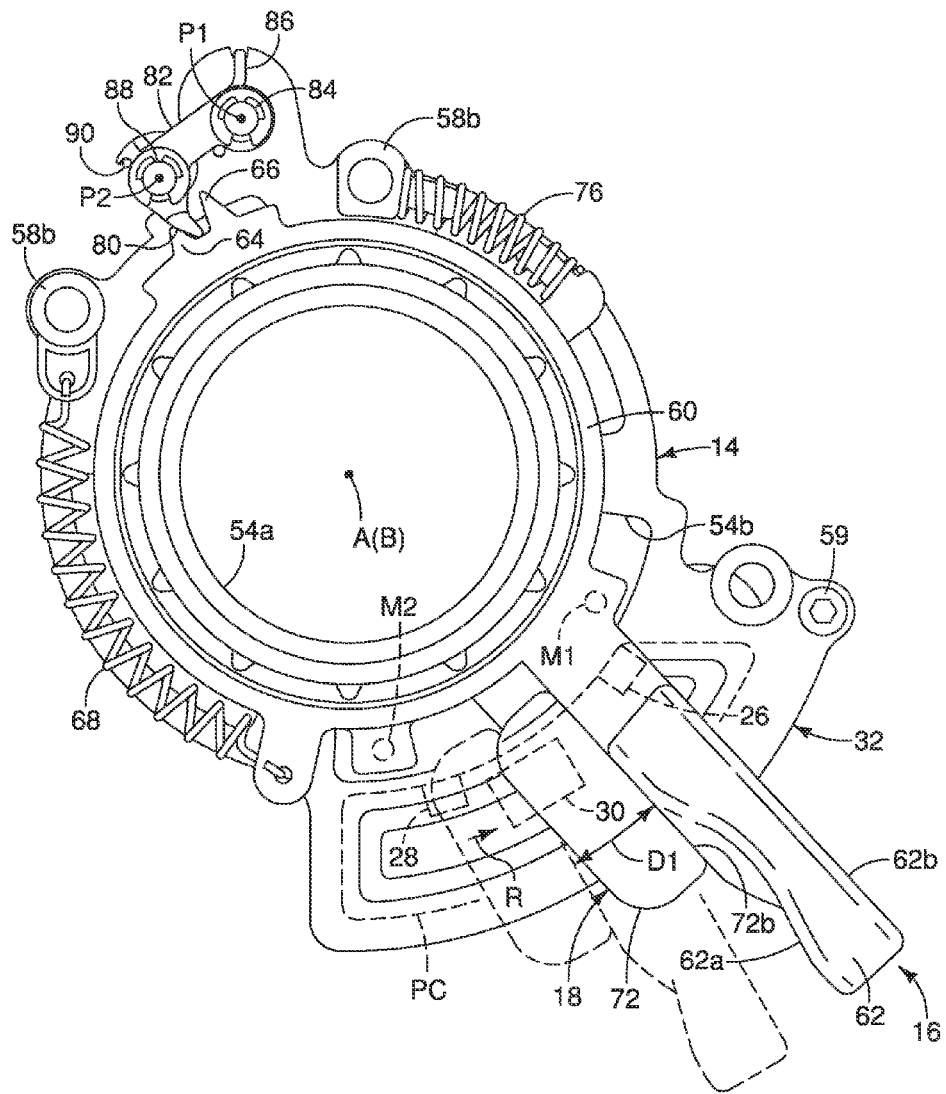
FIG. 13 is an elevational view of the selected parts of the electric shift operating device with the first and second operating members moved to an operated position.
Figure 14:
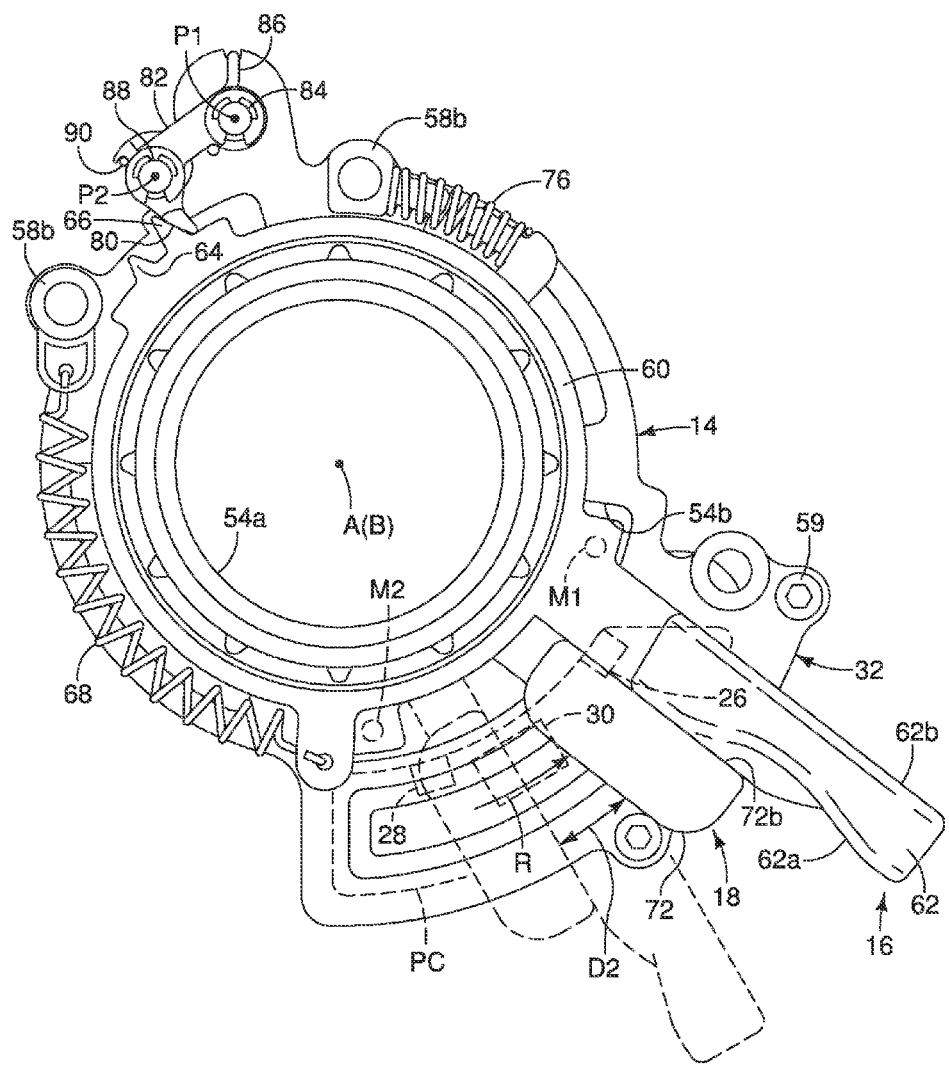
FIG. 14 is an elevational view of the selected parts of the electric shift operating device with the first and second operating members moved to an operated position that is further from the rest position than in FIG. 13.

Referring to FIGS. 11 to 14 in the illustrated embodiment, the first operating member 16 and the second operating member 18 are operated from the first rest position (FIG. 10) and the second rest position (FIG. 10), respectively, in an operating direction (i.e., a first rotational direction R) that is the same with respect to the handlebar axis A. As seen in FIGS. 11 and 12, the first operating member 16 moves (i.e., rotates) with respect to the base member 14 about the handlebar axis A, while the second operating member 18 remains stationary as the first operating member 16 is operated. On the other hand, as seen in FIGS. 13 and 14, the first operating member 16 and the second operating member 18 move together with respect to the base member 14 about the handlebar axis A as the second operating member 18 is operated.

The signal generating arrangement 22 is operated by movement of each of the first and second operating members 16 and 18 moving from the rest position towards their operated positions, respectively. Specifically, in the illustrated embodiment, the signal generating arrangement 22 generates shift signals in accordance with movements of the first and second operating members 16 and 18 moving from their rest positions towards their operated positions. As described above, the two control signals are simultaneously generated as the second operating member 18 is operated. The main microcomputer 33 is programmed so that the main microcomputer 33 ignores the first control signal in such situation.

In the illustrated embodiment, the signal generating arrangement 22 generates the first shift signal as the first operating member 16 reaches the first operated position (FIG. 11). Also the signal generating arrangement 22 generates the second shift signal as the first operating member 16 reaches the second operated position (FIG. 12). The signal generating arrangement 22 generates the third shift signal as the second operating member 18 reaches the first operated position (FIG. 13). Finally, the signal generating arrangement 22 generates the fourth shift signal as the second operating member 18 reaches the second operated position (FIG. 14).

In one embodiment, the signal generating arrangement 22 generates one of an upshift signal and a downshift signal as the first operating member 16 is operated in the first rotational direction R by the first movement amount D1, and generates the other of the upshift signal and the downshift signal as the first operating member 16 is operated in the first rotational direction R by the second movement amount D2. In this way, the first operating member 16 can operate the derailleur 34 for both upshifting and downshifting. In the illustrated embodiment, the first movement amount D1 is smaller than the second movement amount D2. Thus, the second movement amount D2 is different from the first movement amount D1 in the illustrated embodiment.

Alternatively, in another embodiment, the signal generating arrangement 22 and/or the main microcomputer 33 can be selectively programmed so that the first operating member 16 can operate two separate electric shifting devices (e.g., front and rear derailleurs). For example, the signal generating arrangement 22 generates one of an upshift signal and a downshift signal as the first operating member 16 is moved by the first movement amount D1 to operate a first electric shifting device, and generates the other of the upshift signal and the downshift signal as the first operating member 16 is moved by the second movement amount D2 to operate a second electric shifting device. Likewise, the signal generating arrangement 22 also generates one of an upshift signal and a downshift signal as the second operating member 18 is operated in the first rotational direction R by the first movement amount D1. When the second operating member 18 is operated in the first rotational direction R by the second movement amount D2, the signal generating arrangement 22 and/or the main microcomputer 33 can be selectively programmed so that the signal generating arrangement 22 generates either the other of the upshift and downshift signals or a second one of the upshift and downshift signals. Moreover, the signal generating arrangement 22 and/or the main microcomputer 33 can be selectively programmed so that the signal generating arrangement 22 generates one of an upshift signal and a downshift signal as the first operating member 16 is operated and generates the other of the upshift signal and the downshift signal as the second operating member 18 is operated. In this way, each of the first and second operating members 16 and 18 can perform a single shift operation by being operated by the first movement amount D1 and a double shift operation by being operated by the second movement amount D2.

In the illustrated embodiment, the first mounting part 60 is rotatably supported on the base member 14 about the handlebar axis A. The first lever part 62 projects outwardly from the first mounting part 60. Preferably, the first operating member 16 is a trigger operating lever that is biased by the biasing element 68 to the rest position of the first operating member 16 with respect to the base member 14. Here, the biasing element 68 is a coil tension spring that has a first end 68*a* attached to the first operating member 16 and a second end 68*b* that is attached to the spacer 58*a*. Thus, when the first operating member 16 is moved from the rest position (FIG. 14) to an operated position (FIG. 15 or 16), the biasing element 68 is stretched so as to apply a biasing force on the first operating member 16. Preferably, the biasing element 68 is loaded (i.e., slightly stretched) while the first operating member 16 is in the rest position (FIG. 14).

In the illustrated embodiment, the second mounting part 70 is rotatably supported on the base member 14 about the handlebar axis A. The second lever part 72 projects outwardly from the second mounting part 70. Preferably, the second operating member 18 is a trigger operating lever that is biased by the biasing element 76 to the rest position of the second operating member 18 with respect to the base member 14. Here, the biasing element 76 is a coil compression spring that has a first end 76*a* abutting against the second operating member 18 and a second end 76*b* abutting against the spacer 58*b*. Thus, when the second operating member 18 is moved from the rest position (FIG. 14) to an operated position (FIG. 17 or 18), the biasing element 76 is compressed so as to apply a biasing force on the second operating member 18. Preferably, the biasing element 76 is loaded (i.e., slightly compressed) while the second operating member 18 is in the rest position (FIG. 14).

In the illustrated embodiment, the first lever part 62 and the second lever part 72 are offset relative to each other in a rotational direction of the first mounting part 60 and the second mounting part 70. Also the first lever part 62 and the second lever part 72 are at least partially offset relative to each other in a radial direction of the first mounting part 60 and the second mounting part 70 in the illustrated embodiment. The first lever part 62 and the second lever part 72 have different shapes and different sizes. The first lever part 62 of the first operating member 16 includes a user operating surface 62*a* and a non-user operating surface 62*b*. The user operating surface 62*a* is operated by a user as the first operating member 16 is operated. The non-user operating surface 62*b* is untouchably arranged as the first operating member 16 is operated. Likewise, the second lever part 72 of the second operating member 18 includes a user operating surface 72*a* and a non-user operating surface 72*b*. The user operating surface 72*a* is operated by a user as the second operating member 18 is operated. The non-user operating surface 72*b* is untouchably arranged as the second operating member 18 is operated.

Figure 9:
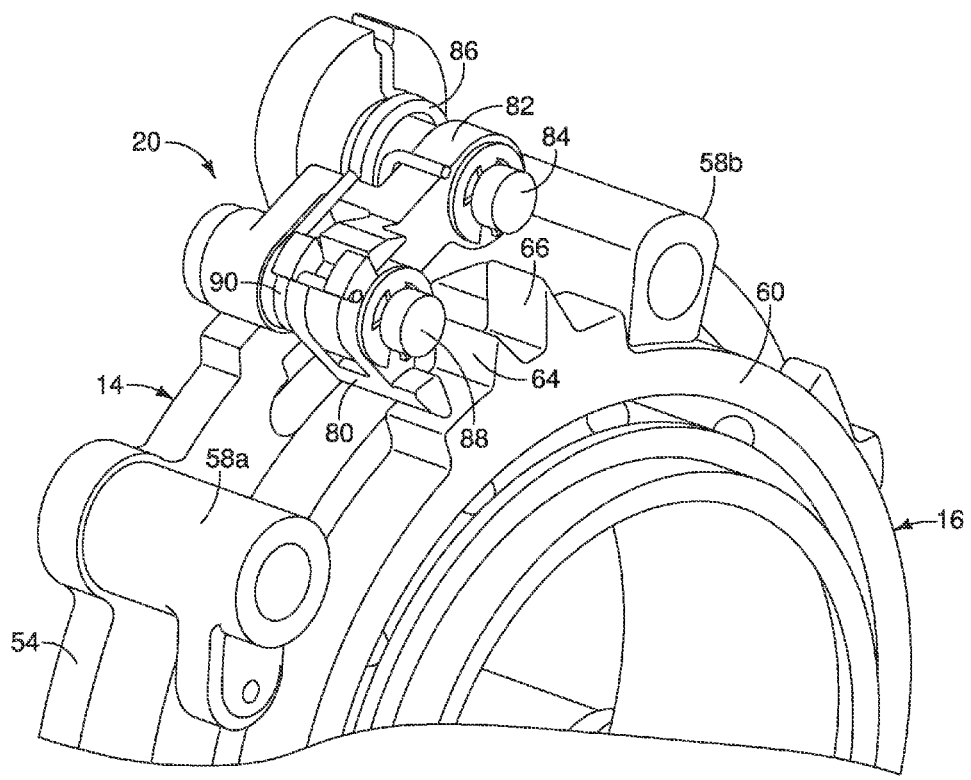
FIG. 9 is a partial perspective view of a portion of the electric shift operating device that includes a clicking mechanism.
Figure 10:
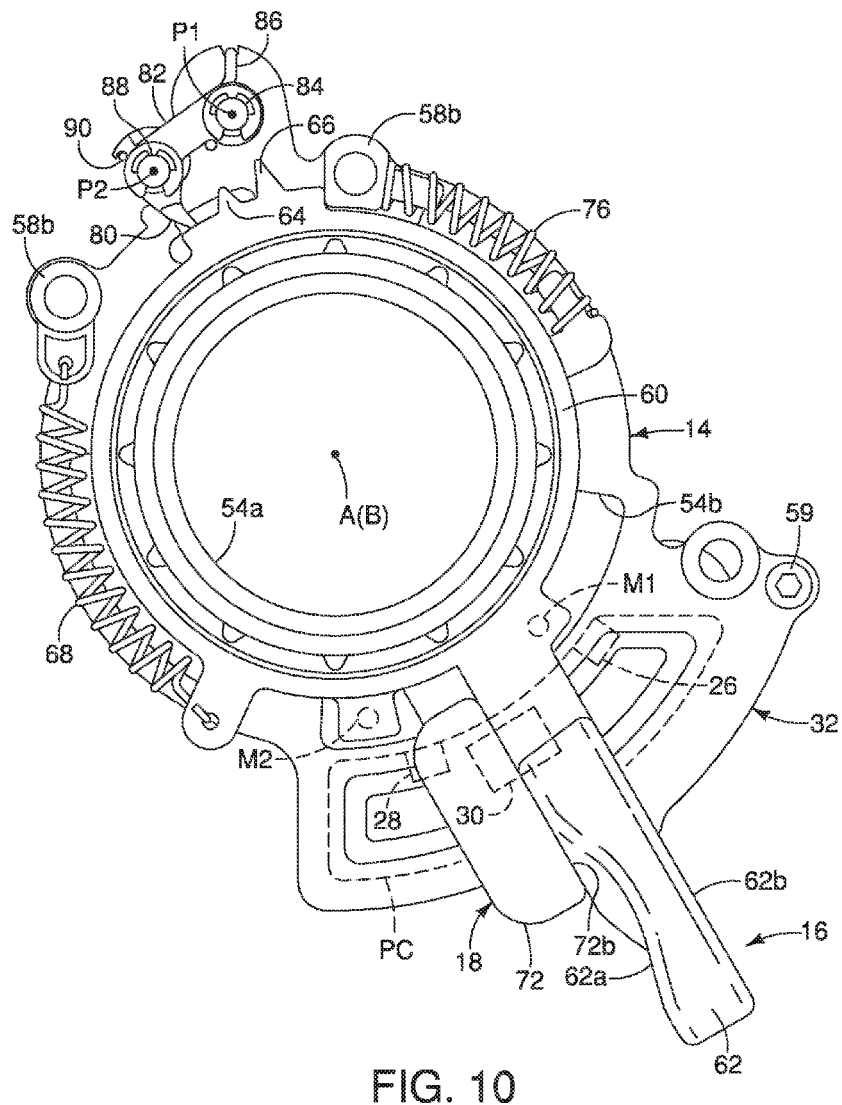
FIG. 10 is an elevational view of the selected parts of the electric shift operating device with the first and second operating members in their rest positions.
Figure 15:
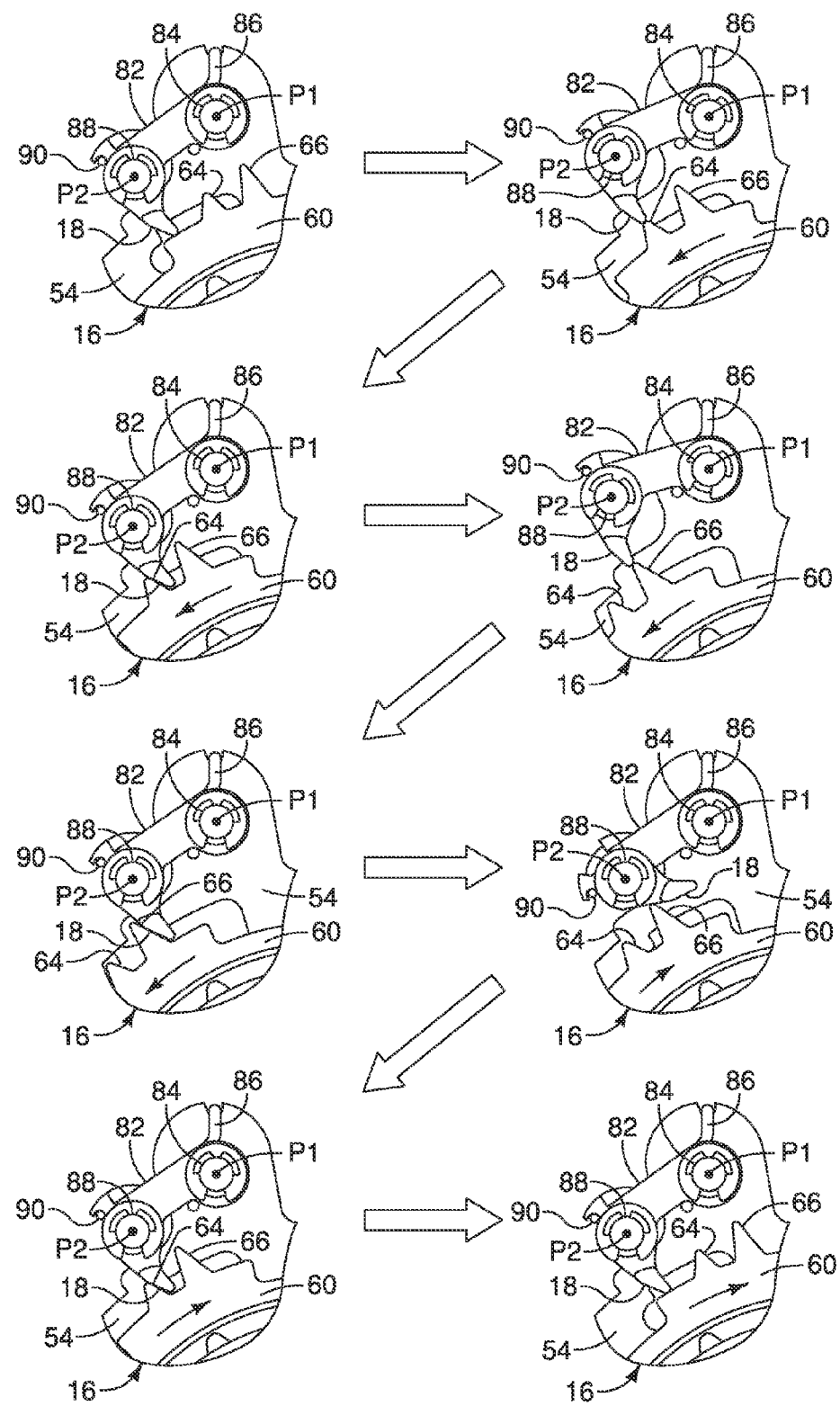
FIG. 15 is a series of partial elevational views of the clicking mechanism of the electric shift operating device being operated.

Referring to FIGS. 9 and 15, the clicking mechanism 20 will be now described in more detail. In the illustrated embodiment, as best seen FIGS. 13 and 14, the clicking mechanism 20 includes a first part 80 contacting at least one of the first operating member 16 and the second operating member 18 to produce a haptic feedback response as each of the first and second operating members 16 and 18 moves from the rest position towards the operated position, respectively. In the illustrated embodiment, the first part 80 is only contacted by the first and second projections 64 and 66 of the first operating member 16 because operation of the second operating member 18 moves the first operating member 16 into contact with the first part 80. If the second operating member 18 were configured to operate independently of the first operating member 16, then the second operating member 18 would be provided with projections similar to the first and second projections 64 and 66 for contacting the first part 80. Thus, the clicking mechanism 20 of the illustrated embodiment could be used with a bicycle component operating apparatus having independently operable operating members such that the operating members all use the same clicking mechanism.

In the illustrated embodiment, the clicking mechanism 20 further includes a second part 82 pivotally mounted to the second support member 54 of the base member 14 about a first pivot axis P1. The first part 80 is pivotally mounted to the second part 82 about a second pivot axis P2. Specifically, a first pivot pin 84 is fixedly attached to the second support member 54. The first pivot pin 84 defines the first pivot axis P1. The second part 82 is pivotally mounted on the first pivot pin 84. A first biasing element 86 is operatively disposed between the second part 82 and the second support member 54. A second pivot pin 88 pivotally attached the first part 80 to the second part 82. The second pivot pin 88 defines the second pivot axis P2. A second biasing element 90 is operatively disposed between the first part 80 and the second part 82.

The second biasing element 90 applies a biasing force on the first part 80 to normally maintain the first part 80 in a predetermined orientation with respect to the second part 82 such that abutments of the first part 80 and the second part 82 abut each other. As a result, the first part 80 only moves relative to the second part 82 as the first and second projections 64 and 66 contact the first part 80 when the first operating member 16 moves from one of the operated positions towards the rest position. In the illustrated embodiment, the second biasing element 90 is a torsion spring having a coiled portion disposed on the second pivot pin 88. One end of the second biasing element 90 contacts the first part 80, while the other end of the second biasing element 90 contacts the second part 82.

The first biasing element 86 applies a biasing force on the second part 82 to bias the second part 82 such that the first part 80 normally contacts the first operating member 16. In other words, the first biasing element 86 biases the first part 80 into engagement with the first operating member 16 while the first operating member 16 is in the first rest position. As a result of this arrangement of the first and second parts 80 and 82, the first and second parts 80 and 82 move together as a unit as the first and second projections 64 and 66 contact the first part 80 when the first operating member 16 moves from the rest position towards one of the operated positions. In the illustrated embodiment, the first biasing element 86 is a torsion spring having a coiled portion disposed on the first pivot pin 84. One end of the first biasing element 86 contacts the second part 82, while the other end of the first biasing element 86 contacts the second support member 54.

Accordingly during operation of the first and second operating members 16 and 18, the first part 80 rotates about the first pivot axis P1 as each of the first and second operating members 16 and 18 moves from the rest position toward one of the operated positions, respectively. Specifically, the first part 80 contacts one or both of the first and second projections 64 and 66 of the first operating member 16 as each of the first and second operating members 16 and 18 moves from the rest position towards the operated position, respectively. The first part 80 remains stationary with respect to the second part 82 as the first part 80 and the second part 82 pivot together about the first pivot axis P1 as each of the first and second operating members 16 and 18 moves from the rest position towards the operated position, respectively.

On the other hand, during release of the first and second operating members 16 and 18, the first part 80 pivots about the second pivot axis P2, which is offset from the first pivot axis P1, as each of the first and second operating members 16 and 18 moves from one of the operated positions toward the rest position, respectively. As a result, the first part 80 moves with respect to the second part 82 about the second pivot axis P2 as each of the first and second operating members 16 and 18 moves from one of the operated positions towards the rest position, respectively.

As mentioned above, the first operating member 16 includes the first projection 64 and the second projection 66. However, alternatively, the first operating member 16 need only include at least one projection, or the first operating member 16 can include more than two projections. In any case, the number of projections will indicate the number of operated positions that can be attained with the shift operating device. The first and second projections 64 and 66 contact the first part 80 and rotates the first part 80 about the first pivot axis P1 as each of the first and second operating members 16 and 18 moves from the rest position towards the operated position, respectively. The first and second projections 64 and 66 also contact the first part 80 and pivots the first part 80 about the second pivot axis P2 as each of the first and second operating members 16 and 18 moves from the operated position towards the rest position, respectively. The first projection 64 has a first height and the second projection 66 has a second height. The first and second heights of the first and second projections 64 and 66 are different from each other. The first projection 64 is closer to the first part 80 than the second projection 66 while the first operating member 16 is at the rest position. The first height of the first projection 64 is smaller than the second height of the second projection 66. By having different heights for the first and second projections 64 and 66, the rider can better distinguish between the two operated positions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only a selected embodiment have been chosen to illustrate the present invention, it will be apparent to those skilled in the art from this disclosure that various changes and modifications can be made herein without departing from the scope of the invention as defined in the appended claims. For example, this invention can be applied for not only a rotary type of a bicycle electric operating device such as described in the illustrated embodiment but can also be applied to any kind of bicycle electric operating device. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. An electric shift operating device comprising:
    a base member configured to be attached to a bicycle;
    a first operating member movably supported on the base member from a first rest position to a first operated position;
    a clicking mechanism operated by the first operating member to produce a haptic feedback response upon the first operating member reaching the first operated position;
    a signal generating arrangement generating a first shift start signal prior to the first operating member reaching the first operated position and prior to the clicking mechanism producing the haptic feedback response; and
    a controller operatively connected to an electric gear changing device to control a gear position of the electric gear changing device, and configured to receive the first shift start signal, the controller operating the electric gear changing device towards a target gear position upon receiving the first shift start signal.

2. The electric shift operating device according to claim 1, wherein
    the signal generating arrangement includes one of a tactile switch, a Hall Effect sensor and a magnetoresistive sensor.

3. The electric shift operating device according to claim 1, wherein
    the signal generating arrangement non-physically detects operation of the first operating member.

4. The electric shift operating device according to claim 1, wherein
    the controller operates the electric gear changing device to start moving towards the target gear position upon receiving the first shift start signal before the clicking mechanism of the electric shift operating device produces the haptic feedback response.

5. The electric shift operating device according to claim 1, further comprising
    a position signal generating arrangement generating a position signal, the controller determining a movement direction of the first operating member based on the position signal.

6. The electric shift operating device according to claim 5, wherein
    the position signal generating arrangement and the signal generating arrangement include a single sensor to generate the shift start signal and the position signal.

7. The electric shift operating device according to claim 6, wherein
    the controller determines the first shift start signal and a movement direction of the first operating member based on a level of voltage or electric signal output of the sensor.

8. The electric shift operating device according to claim 1, wherein
    the controller determines a movement direction of the first operating member after the electric gear changing device starts moving and before the first operating member reaches the first operated position, and
    the controller operates the electric gear changing device towards an original gear position upon determining that the movement direction of the first operating member is towards the rest position.

9. The electric shift operating device according to claim 1, further comprising
    a second operating member movably supported from a second rest position to a second operated position, the clicking mechanism being operated by the second operating member to produce a haptic feedback response upon the second operating member reaching the second operated position, and the signal generating arrangement generating a second shift start signal prior to or upon the second operating member reaching the second operated position, the controller operating the electric gear changing device towards a target gear position upon receiving the second shift start signal.

10. A bicycle shifting system comprising:
    an electric gear changing device;
    an electric shift operating device including a first operating member, a clicking mechanism and a signal generating arrangement, the first operating member being movably supported from a first rest position to a first operated position, the clicking mechanism being operated by the first operating member to produce a haptic feedback response upon the first operating member reaching the first operated position, the signal generating arrangement generating a shift start signal prior to the first operating member reaching the first operated position and prior to the clicking mechanism producing the haptic feedback response; and
    a controller operatively connected to the electric gear changing device to control a gear position of the electric gear changing device, and operatively connected to the electric shift operating device to receive the shift start signal of the signal generating arrangement, the controller operating the electric gear changing device towards a target gear position upon receiving the shift start signal from the electric shift operating device.

11. The bicycle shifting system according to claim 10, wherein
    the signal generating arrangement generates an electric signal as the first operating member moves in a direction away from the first rest position prior to reaching the first operated position.

12. The bicycle shifting system according to claim 11, wherein
    the controller determines the electric signal as the shift start signal upon a level of the electric signal becoming above a predetermined level.

13. The bicycle shifting system according to claim 10, wherein
    the signal generating arrangement non-physically detects operation of the first operating member.

14. The bicycle shifting system according to claim 10, wherein the controller operates the electric gear changing device to start moving towards the target gear position upon receiving the shift start signal from the electric shift operating device before the clicking mechanism of the electric shift operating device produces the haptic feedback response.

15. The bicycle shifting system according to claim 10, wherein
the controller determines a movement direction of the first operating member based on the shift start signal from the signal generating arrangement.

16. The bicycle shifting system according to claim 15, wherein
the controller determines the electric signal as the shift start signal and determines the movement direction of the first operating member based on a level of the electric signal.

17. The bicycle shifting system according to claim 10, wherein
the controller determines a movement direction of the first operating member after the electric gear changing device starts moving and before the first operating member reaches the first operated position, and
the controller operates the electric gear changing device towards an original gear position upon determining that the movement direction of the first operating member is from the first operated position towards the rest position.

18. The bicycle shifting system according to claim 17, wherein
the controller determines the movement direction of the first operating member based on the shift start signal from the signal generating arrangement.

19. The bicycle shifting system according to claim 10, further comprising
a second operating member movably supported from a second rest position to a second operated position, the clicking mechanism being operated by the second operating member to produce a haptic feedback response upon the second operating member reaching the second operated position, and the signal generating arrangement generating a shift start signal prior to or upon the second operating member reaching the second operated position.

* * * * *